United States Patent
Brand

(10) Patent No.: US 9,521,217 B2
(45) Date of Patent: Dec. 13, 2016

(54) SYSTEM AND METHOD FOR REMOTE ACCESS TO CLOUD-ENABLED NETWORK DEVICES

(71) Applicant: CTERA Networks, Ltd., Petach Tikva (IL)

(72) Inventor: Aron Brand, Petach-Tikva (IL)

(73) Assignee: Ctera Networks, Ltd., Petach Tivka (IL)

( * ) Notice: Subject to any disclaimer, the term of this patent is extended or adjusted under 35 U.S.C. 154(b) by 0 days.

(21) Appl. No.: 14/520,975

(22) Filed: Oct. 22, 2014

(65) Prior Publication Data

US 2015/0046521 A1 Feb. 12, 2015

Related U.S. Application Data

(63) Continuation of application No. 13/205,238, filed on Aug. 8, 2011, now Pat. No. 8,886,714.

(51) Int. Cl.

| | |
|---|---|
| *G06F 15/16* | (2006.01) |
| *H04L 29/06* | (2006.01) |
| *H04L 29/08* | (2006.01) |
| *G06F 9/06* | (2006.01) |
| *G06F 17/30* | (2006.01) |

(52) U.S. Cl.
CPC ............... *H04L 67/42* (2013.01); *G06F 9/06* (2013.01); *G06F 17/30091* (2013.01); *H04L 63/029* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 7,203,796 | B1 | 4/2007 | Muppalaneni et al. |
| 7,430,639 | B1 | 9/2008 | Bali et al. |
| 7,596,620 | B1 | 9/2009 | Colton et al. |
| 7,752,180 | B1 | 7/2010 | Fair et al. |
| 7,865,663 | B1 | 1/2011 | Nelson et al. |
| 2004/0054891 | A1 | 3/2004 | Hengeveld et al. |
| 2006/0010154 | A1 | 1/2006 | Prahlad et al. |
| 2006/0230076 | A1 | 10/2006 | Gounares et al. |
| 2006/0230245 | A1 | 10/2006 | Gounares et al. |
| 2007/0143589 | A1* | 6/2007 | Rawe ............... G06F 9/441 713/2 |
| 2007/0250593 | A1 | 10/2007 | Sikdar et al. |
| 2008/0005168 | A1 | 1/2008 | Huff et al. |

(Continued)

*Primary Examiner* — Wing F Chan
*Assistant Examiner* — Padma Mundur
(74) *Attorney, Agent, or Firm* — M&B IP Analysts, LLC

(57) ABSTRACT

A system and method for optimizing communication between a client and a cloud-enabled network device communicating over the internet are provided. The method includes receiving a request from the client to access a user interface of the cloud-enabled network device; checking if the request is for a static resource of the user interface; upon determining that the request is for a static resource, sending the static resource from the cloud relay server to the client over the internet; and relaying the request to the cloud-enabled network device over the secure tunnel if the request cannot be served by the cloud relay server. In an embodiment, the cloud-enabled network device is connected in a local area network and communicates with the cloud relay server over a secure tunnel.

13 Claims, 5 Drawing Sheets

(56) References Cited

U.S. PATENT DOCUMENTS

| | | |
|---|---|---|
| 2008/0080552 A1 | 4/2008 | Gates et al. |
| 2009/0006792 A1 | 1/2009 | Federwisch et al. |
| 2009/0006869 A1 | 1/2009 | Satya |
| 2009/0007234 A1 | 1/2009 | Birger et al. |
| 2009/0031212 A1* | 1/2009 | Hsu ................. G06F 9/5055 715/234 |
| 2009/0144422 A1 | 6/2009 | Chatley et al. |
| 2009/0300169 A1 | 12/2009 | Sagar et al. |
| 2010/0042720 A1* | 2/2010 | Stienhans ............ G06F 9/5072 709/226 |
| 2010/0088150 A1 | 4/2010 | Mazhar et al. |
| 2010/0161759 A1* | 6/2010 | Brand ................ H04L 67/1097 709/218 |
| 2010/0318632 A1 | 12/2010 | Yoo et al. |
| 2010/0332401 A1 | 12/2010 | Prahlad et al. |
| 2010/0332588 A1* | 12/2010 | Schwimer ............ H04L 67/306 709/203 |
| 2011/0054878 A1 | 3/2011 | Zhang et al. |
| 2011/0082982 A1 | 4/2011 | Harvell et al. |
| 2012/0137213 A1 | 5/2012 | Hayler et al. |
| 2013/0204849 A1 | 8/2013 | Chacko |
| 2014/0082131 A1 | 3/2014 | Jagtap |
| 2014/0082156 A1 | 3/2014 | Jagtap |

* cited by examiner

SYSTEM AND METHOD FOR REMOTE ACCESS TO CLOUD-ENABLED NETWORK DEVICES

CROSS-REFERENCE TO RELATED APPLICATIONS

This application is a continuation of U.S. patent application Ser. No. 13/205,238 filed on Aug. 8, 2011, now allowed, which is hereby incorporated by reference for all that it contains.

TECHNICAL FIELD

The invention generally relates to network devices that are integrated with cloud services, and more particularly to techniques for allowing efficient and secure remote access to such devices.

BACKGROUND

The demand for storage has been rapidly increasing. As the amount of data such as digital media stored by users grows, so does the need to store digital media reliably over extended periods of time. Traditional backup solutions periodically copy data to, for example, backup tapes, compact discs (CDs), or other local storage media. However, such solutions are not optimal because the backup media is stored in a single location and media used for backups are prone to failure.

Commercially available services referred to as cloud storage services provide mass storage through web service interfaces available through the Internet. The storage infrastructure includes a distributed array of geographically distributed data centers connected to a plurality of clients through a wide area network (WAN). A data center typically consists of servers and mass storage facilitating cloud storage services to the clients. Such services enable applications including, for example, backup and restore of data, data synchronization, file sharing, and so on.

Cloud storage services are accessible from anywhere in the world through a client implementing a web services interface designed to at least synchronize data with the data centers. However, such web services fail to provide standard file sharing protocols (e.g., common internet file system (CIFS) or network file system (NFS)). In addition, accessing files stored in the cloud storage from the LAN is typically many times slower than accessing files stored in storage devices on the same LAN.

A network attached storage (NAS) device for performing NAS operations with cloud storage services is also discussed in the related art. Such a NAS device provides the functionality of data storage, file-based operations (e.g., read, write, delete, modify, etc.), and the management of these functionalities to clients on the network. Specifically, a client can store data in its local storage which is also synchronized with a cloud storage service. The client can access and perform file-based operations either on its local storage or the cloud storage service. An access to the files in the device is only through a local area network, while access to the cloud storage is through a web portal. An example for a NAS device that provides cloud storage services can be found in a Co-Pending patent application Ser. No. 12/641,559 entitled "STORAGE DEVICE AND METHOD THEREOF FOR INTEGRATING NETWORK ATTACHED STORAGE WITH CLOUD STORAGE SERVICES," assigned to common assignee, the contents of which are herein incorporated by reference.

Network devices are commonly accessed using a Web-based interface enabling control of the devices. However, a number of practical factors restrict the possibility of accessing network devices over the web. A local area network (LAN), in which the devices operate, is often protected by a firewall or a network address translation (NAT) device, which prevents remote users from connecting to the device. Even if firewalls are reconfigured to allow access, the LAN network may be set with Network Address Translation (NAT) to a dynamic public IP address, which makes locating the device difficult. Furthermore, even if access is allowed by firewalls or made possible by a VPN (Virtual Private Network), the Internet connection of the LAN network, using last mile access technologies such as Asymmetric Digital Subscriber Line (ADSL), is often slow (especially in the upstream direction), congested, and has high latency, resulting in poor responsiveness when accessed remotely.

It would be therefore advantageous to provide a solution for allowing secure remote access to network devices over the World Wide Web. It would be further advantageous if the proposed solution would accelerate such remote access for optimized application responsiveness.

SUMMARY

Certain embodiments disclosed herein include a method for optimizing communication between a client and a cloud-enabled network device communicating over the internet. The method includes receiving a request from the client to access a user interface of the cloud-enabled network device; checking if the request is for a static resource of the user interface; upon determining that the request is for a static resource, sending the static resource from the cloud relay server to the client over the internet; and relaying the request to the cloud-enabled network device over the secure tunnel if the request cannot be served by the cloud relay server. In an embodiment, the cloud-enabled network device is connected in a local area network and communicates with the cloud relay server over a secure tunnel.

Certain embodiments disclosed herein also include a system for optimizing communication between a client and a cloud-enabled network device communicating over the internet. The system comprises a processor; and a memory, the memory containing instructions that, when executed by the processor, configure the system to: receive a request from the client to access a user interface of the cloud-enabled network device; check if the request is for a static resource of the user interface; upon determining that the request is for a static resource, send the static resource from the cloud relay server to the client over the internet; and relay the request to the cloud-enabled network device over the secure tunnel if the request cannot be served by the cloud relay server. In an embodiment, the cloud-enabled network device is connected in a local area network and communicates with the cloud relay server over a secure tunnel.

Certain embodiments disclosed herein also include a method and system for optimizing communication between a client and a cloud-enabled network device communicating over the internet. The method comprises receiving a request from the client to access a user interface of the cloud-enabled network device; checking if the request is for accessing a file locally stored in the cloud-enabled network device; and checking if an up-to-date copy of the file is available in a cloud storage system (CSS); upon determining that the request is for accessing a file available in the CSS, returning the file, by the cloud relay server, from the CSS storing a copy of the requested file.

BRIEF DESCRIPTION OF THE DRAWINGS

The subject matter disclosed herein is particularly pointed out and distinctly claimed in the claims at the conclusion of the specification. The foregoing and other features and advantages of the invention will be apparent from the following detailed description taken in conjunction with the accompanying drawings.

DETAILED DESCRIPTION OF THE INVENTION

Figure 1:
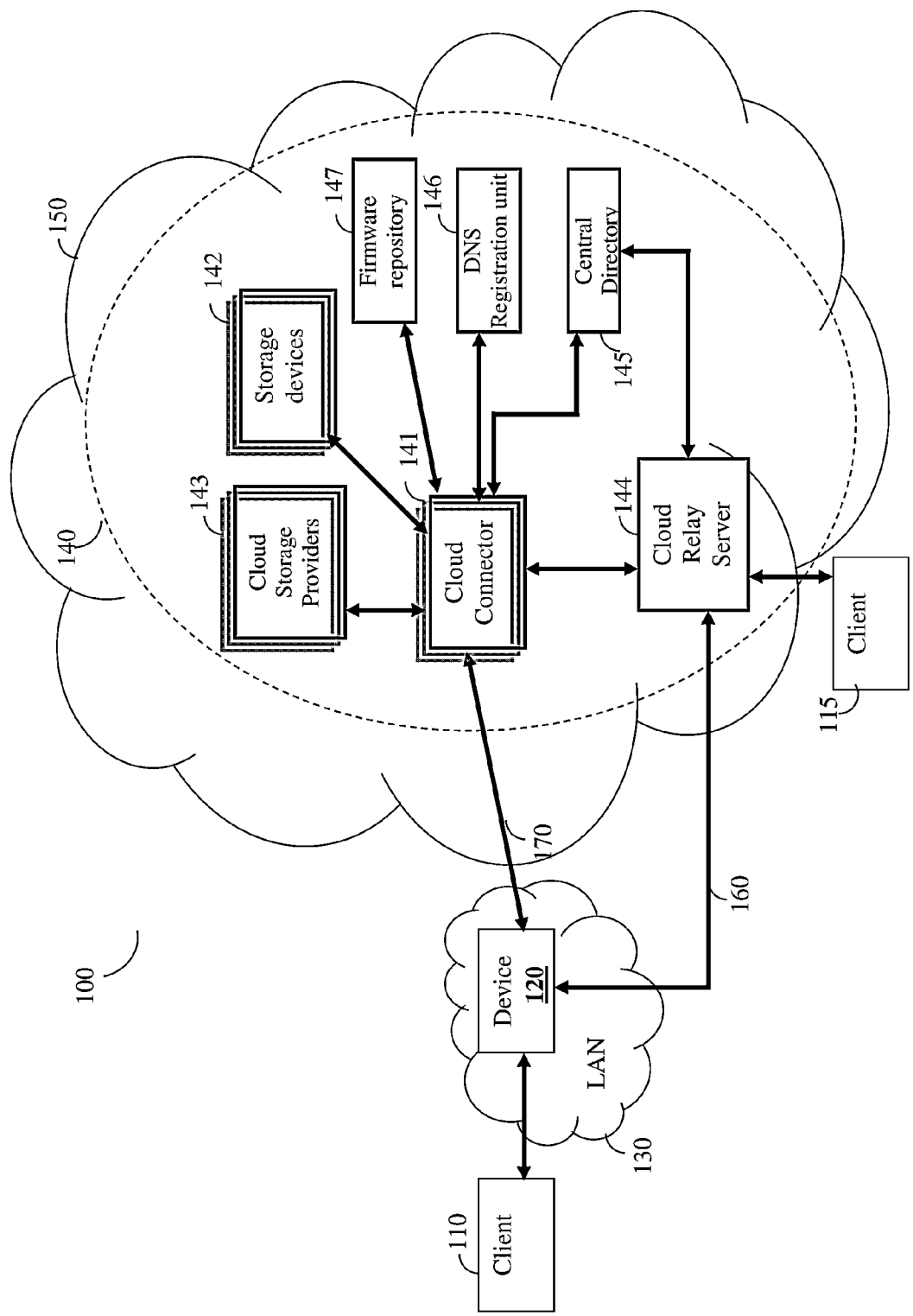
FIG. 1 is a storage network system useful in describing the principles of the invention.

It is important to note that the embodiments disclosed are only examples of the many advantageous uses of the innovative teachings herein. In general, statements made in the specification of the present disclosure do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting diagram of a storage network system 100 utilized to describe the various disclosed embodiments. The system 100 includes a client 110 connected to a device 120 through a local area network (LAN) 130, which may be either a wireless or wired network. In addition, a client 115 can access the device 120 through a network 150 which may be the Internet or a wide area network (WAN).

The device 120 is connected to a cloud storage service (CSS) 140 through the network 150. The CSS 140 consists of a plurality of cloud connectors 141 that facilitate connections between the device 120 and storage devices 142 (e.g., disk drives and/or SAN/NAS devices) as well as connections to public cloud storage providers 143 (e.g., Amazon® Web Services, Nirvanix, etc.).

In accordance with an embodiment, the device 120 is a NAS device that provides cloud storage services. An example of such a device is disclosed in the above-referenced co-pending patent application Ser. No. 12/641,559. The device 120 is connected in the LAN 130, and as such is protected by a firewall that protects the device from remote access attempts through the Internet. Commonly, the firewall also acts as a NAT device, translating private IP addresses of a device in the LAN to one or more public IP addresses, which are possibly dynamic addresses.

Certain embodiments disclosed herein allow the client 115 to remotely access the device 120 through the network 150. With this aim, the CSS 140 also includes at least one cloud relay server 144, a central directory 145, and a DNS registration unit 146, all of which are connected to the cloud connectors 141.

Each of the cloud connectors 141 is assigned a fixed internet protocol (IP) address. The device 120 establishes a management link 170 with one of the cloud connectors 141 that is selected arbitrarily. The management link 170 is an active connection secured using a communication protocol including, but not limited to, Transport Layer Security (TLS), Secure Sockets Layer (SSL), IPSEC, and the like. The device 120 sends periodical "keep-alive" messages over the management link to ensure that the connection is alive. If the connection is lost, the management link 170 is re-established by the device 120. As an outgoing connection, the management link 170 is permitted to pass through any firewall and/or NAT device connected in the LAN 130. Over the management link 170, the cloud connector 141 and the device 120 can reliably exchange incoming and outgoing messages.

The cloud connectors 141 use the central directory 145 to keep records of which device 120 is currently connected to which connector 141. It should be noted that although a single device 120 is shown in FIG. 1, the system 100 may include a plurality of devices such as the device 120 connected in the LAN 130 or other LANs. Thus, the cloud connectors 141 can manage the connections to multiple devices 120.

The cloud relay server 144 has a secure and trusted communications channel to the cloud connectors 141 and central directory 145. When a device is added to the system 100, a unique domain name system (DNS) record is created. Specifically, the domain name of the device (e.g., device-name.myservice.com) is mapped to an IP address of the cloud relay server 144. In an exemplary embodiment, the mapping is performed by insertion of an address record "A" Type record as described, for example, by IETF RFC 1035, DOMAIN NAMES—IMPLEMENTATION AND SPECIFICATION, P. Mockapetris, Section 3.2.2. Such mapping is performed by the DNS registration unit 146 under the control of a cloud connector 141. For Load balancing between multiple cloud relay servers, techniques such as, but not limited to, round robin DNS can be employed. It should be noted that in certain embodiments, the cloud relay server 144 and cloud connector 141 may be implemented as a single server combining both functions.

According to the teachings of certain disclosed embodiments, the client 115 can remotely access the device 120 using the HTTP protocol, over the network 150 through the cloud relay server 144. Specifically, a secure tunnel 160 is established from the device 120 to the cloud relay server 144, under the control of the cloud connector 141. Over the secure tunnel 160, the client 115 can access the device 120, for example, using an HTTP or HTTPS protocol. In an embodiment, the device 120 provides to the client an access to a user interface, through which the client 115 (and also client 110) can manage and access resources of the device 120. For example, the client 115 can perform file-based operations on files stored in the device 120, upload/download files, or can configure various setting of the device 120 using the user interface. Exemplary screenshots of the user interface are provided in FIGS. 2A and 2B.

Figure 2A:
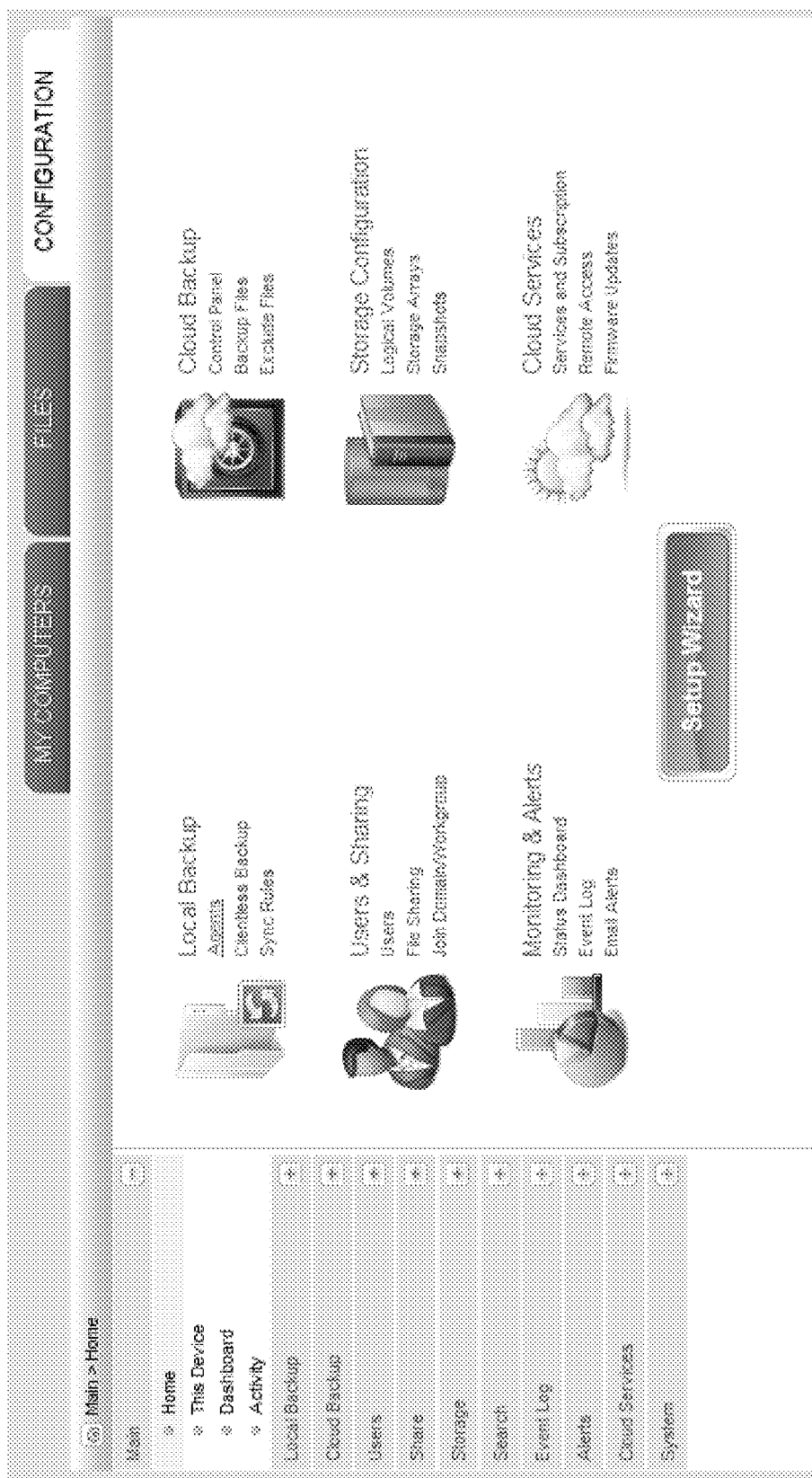
FIGS. 2A and 2B are exemplary screenshots of a user interface of a device.
Figure 2B:

FIG. 2A depicts an exemplary configuration tab of the device 120 in which a user of client 115 can set the files to be backed up, schedule cloud synchronizations, define user accounts, view reports, set alarms, and so on. FIG. 2B is a list of folders including files stored in the device 120 as well as files synchronized with the CSS 140. The user of the client 115 can remotely perform file-based operations on files stored in the device 120, download files, and upload files to the device.

Figure 3:
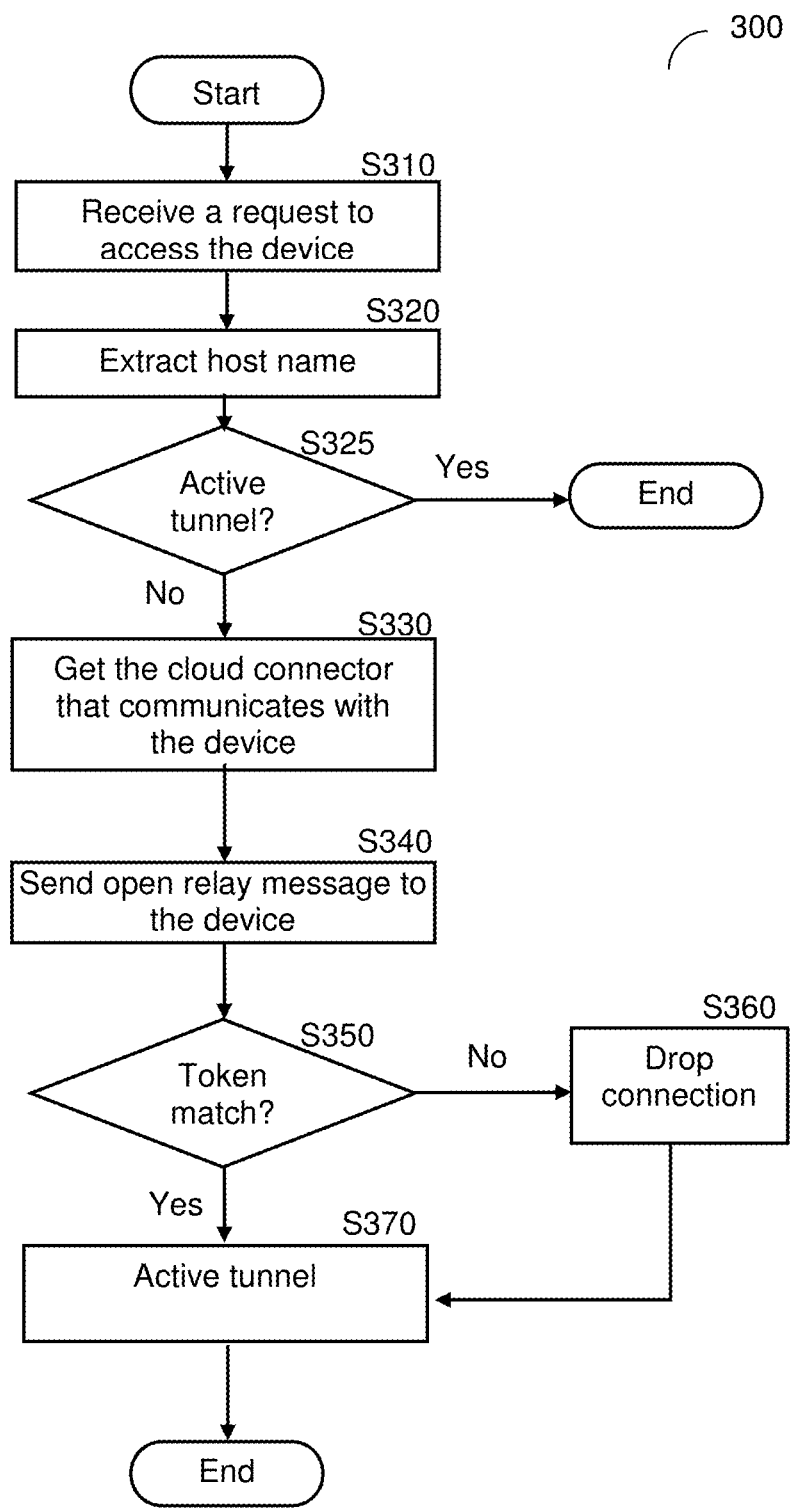
FIG. 3 is a flowchart describing a method for enabling a remote access to the device in accordance with an embodiment of the invention.

FIG. 3 shows an exemplary and non-limiting flowchart 300 describing a method for enabling a remote access to a NAS device that provides cloud services according to an embodiment of the invention. In a non-limiting embodiment and without departing from the scope of the disclosed embodiments, the method will be described with a reference to the system 100 depicted in FIG. 1.

At S310, a request to access the device 120 over the network 150 is received at the cloud relay server 144. The request may be, for example, a hypertext transfer protocol (HTTP) or HTTPS request. At S320, a host name (designating the device 120) is extracted from the request, e.g., from the Host header of the HTTP request. At S325, it is checked if there is an existing authenticated tunnel from the cloud relay server 144 to the device 120, and if so execution ends; otherwise, continuing with S330, where the central repository 145 is inquired to retrieve the cloud connector 141 that currently serves the device 120.

At S340, an open relay message is sent to the device 120 from the cloud relay server 144 to a cloud connector 141 over the management link 170. The open relay message includes the ID of the target device 120, the IP address of the relay server 144, a secret token, and the IP address of the client 115. In an exemplary embodiment, the secret token includes a large random number.

The device 120, upon reception of the open relay message, opens a connection, the secure tunnel 160, with the relay server 144. In an embodiment of the invention, the secure tunnel 160 is an IP connection secured using the protocols SSL, TLS, IPSEC, and the like. The device validates the cloud relay server's Security Certificate. If the certificate is valid, the secret token is sent to the relay server 144 over the tunnel 160.

At S350, the server 144 compares the received secret token with its generated token (included in the open relay message), and if the tokens match, the device 120 is considered authenticated and the secure tunnel 160 is set to be active; otherwise, the connection is dropped at S360, and execution ends.

At S370, once the secure tunnel is active all requests from the client 115 received from the Internet network 150 are relayed to the device over the tunnel, and the corresponding responses are relayed back to the client 115. In one embodiment, the secure tunnel becomes inactive when no communication occurs during a predefined time interval.

According to an embodiment, clients that seek to remotely access the device 120 and are located in the same network segment as the device 120 can automatically bypass the relay server 144 to communicate with the device directly. This approach will reduce the latency and network traffic to improve responsiveness of the user interface of the device.

According to this embodiment, the device 120 reports its internal network interfaces list, defined by pairs of an IP address and a network mask, to a cloud connector 141 over the management link 170. The device 120 also reports its private IP address in the LAN. In addition, the cloud connector 141 stores the device 120's public IP address, which is the source IP address of the management link 170.

When the cloud connector 141 receives an open relay message (defined above), it is assumed that the client (e.g., client 115) can connect to the device 120 directly, without requiring a cloud relay server, if at least one of the following conditions is satisfied: 1) the client's (e.g., client 115) source IP address equals to the device public IP address, this is a good indication that the client and the device are behind the same NAT device; and 2) the client's (e.g., client 115) source IP address is within the IP network defined by the device 120 reported network interfaces list.

If at least one of the above conditions is true, the cloud relay server 144 returns to the client a permanent redirect response, for example, HTTP 301 Moved Permanently response, replacing the target hostname with the device's private IP address. Following this redirect response, the client 115 using, for example, its web browser proceeds by communicating directly with the device 120 over the LAN 130 bypassing the cloud relay server 144 entirely.

Figure 4:
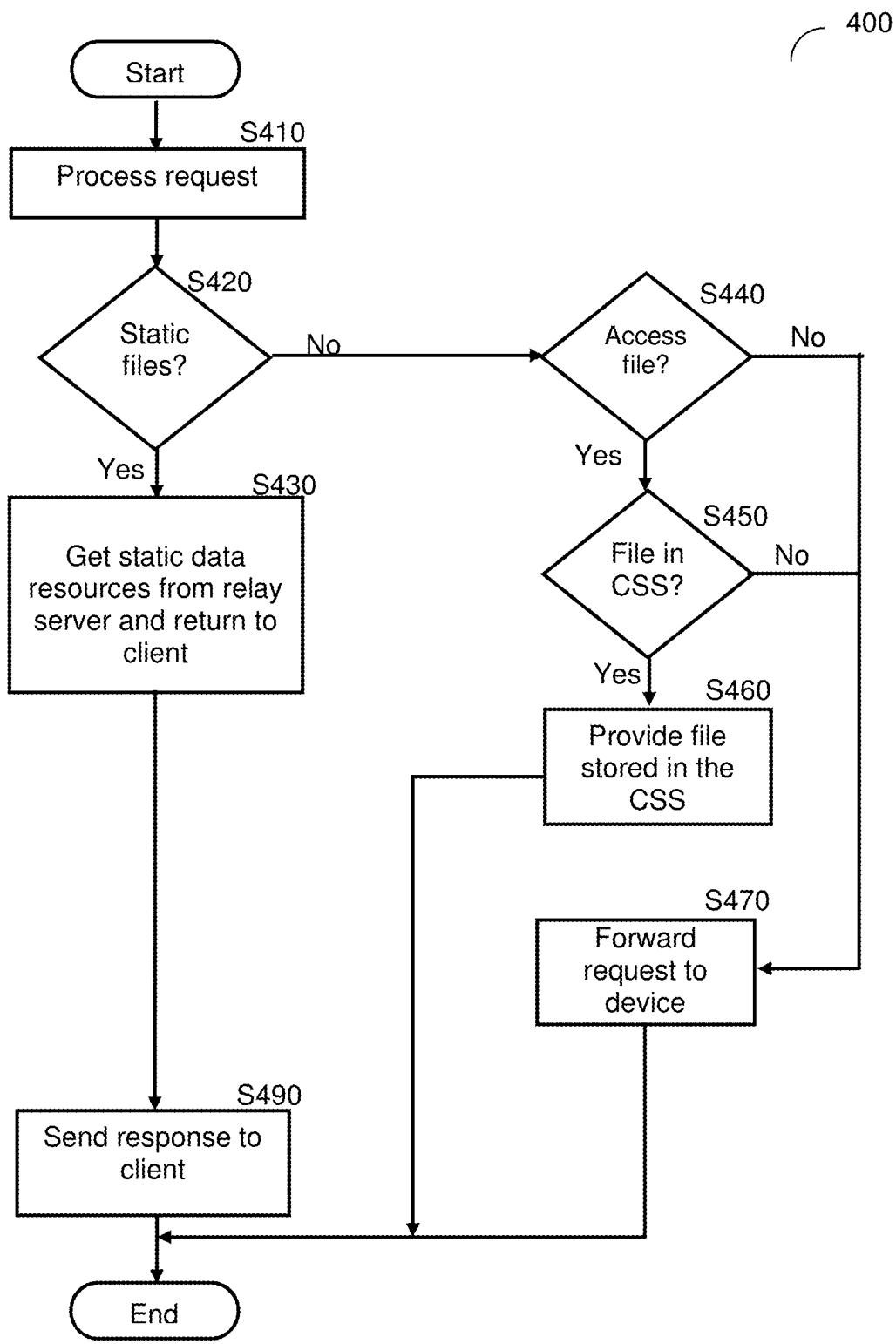
FIG. 4 is a flowchart describing a method for optimizing communication between a web client and the device in accordance with an embodiment of the invention.

FIG. 4 shows an exemplary and non-limiting flowchart 400 illustrating a method for optimizing the communication between a client and cloud-enabled device according to an embodiment of the invention. In a non-limiting embodiment and without departing from the scope of the invention, the method will be described with reference to the system 100 depicted in FIG. 1.

As discussed above, the client 115 accesses the device 120 over the Internet through the cloud relay server 144. The client 115 interacts with a user interface of the device 120 in order to change the setting of the device and/or perform file-based operations on files stored in the device.

In an embodiment, the user interface is a web application that can be accessed using a web browser. The web application may be embedded in a firmware (or software) that resides in a persistent storage (not shown) of the device 120. The firmware includes, among other things, static files used by the web application, such as HTML and graphics files. For example, the screenshot depicted in FIG. 2A contains a collection of icons, which are static files.

In an embodiment, the CSS 140 includes a firmware updates service. An updated image of the firmware is maintained by the cloud connectors 141 for each device in a firmware repository 147. The cloud connectors 141 update the device 120 with a new image of the firmware. The cloud relay server 144 can access the firmware repository to retrieve an image of the firmware. Thus, according to an embodiment, the cloud relay server 144 caches an image of the most updated firmware of each device with which it has an active tunnel 160.

At S410, upon receiving a request, e.g., HTTP GET request from the client 115 for a web resource, the cloud relay server 144 processes the request to determine if it can be satisfied by the cloud relay server 144.

At S420, a requested uniform resource identifier (URI) in the request is checked against a list of static files. If the URI is found in the static files list, execution continues with S430 where the static file is retrieved from the cached image of the firmware and returned to the client at S490. Thus, for static resources, no data is sent or received from the device 120 over the secure tunnel 160. It should be noted that as the link to the datacenter of CSS 140 is much faster than the Internet connection of the LAN, the application responsiveness is significantly improved.

If S420 results with a NO answer, i.e., the requested URI is not found in the static files list, execution proceeds to S440, where another check is made to determine if the request is to access a file saved locally in the device 120. If S440 results with a YES answer, at S450 it is checked if the requested file is saved in the CSS 140. The check is performed by inquiring the cloud connector 141 that maintains the updated status of files managed by the device 120. If the requested file is in the CSS 144, then at S460, the client 115 is provided with the file stored in the CSS 144, thus no data is sent or received from the device 120 over the secure tunnel 160. It should be noted that as the link to the datacenter of CSS 140 is much faster than the Internet connection to the LAN, the latency in accessing the file is significantly reduced.

If S440 and S450 result with a NO answer, execution proceeds to S470 where the received request is relayed to the device 120 over the active tunnel 160, which returns the resource to the client in step S490.

The invention has been described with reference to a specific embodiment where the device 120 is a NAS device that enables cloud storage services. However, the teachings disclosed herein can be adapted to support secure, efficient remote access through the Internet to any cloud-enabled device having a user interface, that is, a device having a permanent link to a cloud based service.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the embodiments of the invention disclosed herein can be implemented as any combination of hardware, firmware, and software. Moreover, the software is preferably implemented as an application program tangibly embodied on a program storage unit or computer readable medium. One of ordinary skill in the art would recognize that a "computer readable medium" is any non-transitory readable medium, except for a transitory propagating signal, for storing data and can be in a form of a digital circuit, an analogy circuit or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What is claimed is:

1. A method for optimizing communication between a client and a cloud-enabled network device communicating over the internet, comprising:
   receiving, at a cloud relay server, a request from the client to access a user interface of the cloud-enabled network device;
   checking if the request is for a static resource of the user interface;
   upon determining that the request is for a static resource of the user interface, sending the static resource from the cloud relay server to the client over the internet, wherein the static resource of the user interface is retrieved from a firmware image matching a respective firmware image of the cloud-enabled network device that is cached in the cloud relay server, wherein the firmware image is retrieved from a firmware repository of a firmware update service that contains the most updated firmware image of the cloud-enabled network device that the cloud relay server has an active secure tunnel with; and
   relaying the request to the cloud-enabled network device over the secure tunnel established between the cloud-enabled network device and the cloud relay server when the request cannot be served by the cloud relay server.

2. The method of claim 1, further comprising:
   checking if the request is for accessing a file locally stored in the cloud-enabled network device; and
   checking if an up-to-date copy of the file is available in a cloud storage system (CSS);
   upon determining that the request is for accessing a file available in the cloud storage system, returning the file, by the cloud relay server, from a cloud storage system (CSS) storing a copy of the requested file.

3. The method of claim 1, wherein the user interface is at least a web application.

4. The method of claim 3, wherein the cloud relay server maintains a cached copy of the web application.

5. The method of claim 1, further comprising:
   updating the user interface by a cloud connector connected to the cloud-enabled network device through a management link established between the cloud connector and the cloud-enabled network device.

6. The method of claim 1, wherein checking if the request is for the static resource further comprising:
   checking a uniform resource identifier (URI) in the request against a list of URI of static resources maintained by the cloud relay server.

7. A non-transitory computer readable medium having stored thereon instructions for performing the method of claim 1.

8. A system for optimizing communication between a client and a cloud-enabled network device communicating over the internet, comprising:
   a processor; and
   a memory, the memory containing instructions that, when executed by the processor, configure the system to:
   receive, at a cloud relay server, a request from the client to access a user interface of the cloud-enabled network device;
   check if the request is for a static resource of the user interface;
   upon determining that the request is for a static resource of the user interface, send the static resource from the cloud relay server to the client over the internet, wherein the static resource of the user interface is retrieved from a firmware image matching a respective firmware image of the cloud-enabled network device that is cached in the cloud relay server, wherein the firmware image is retrieved from a firmware repository of a firmware update service that contains the most updated firmware image of the cloud-enabled network device that the cloud relay server has an active secure tunnel with; and
   relay the request to the cloud-enabled network device over the secure tunnel established between the cloud-enabled network device and the cloud relay server when the request cannot be served by the cloud relay server.

9. The system of claim 8, wherein the system is further configured to:
   check if the request is for accessing a file locally stored in the cloud-enabled network device; and
   upon determining that the request is for accessing a file, return the file, by the cloud relay server, from a cloud storage system (CSS) storing a copy of the requested file.

10. The system of claim 9, wherein the user interface is at least a web application.

11. The system of claim 10, wherein the cloud relay server maintains a cached copy of the web application.

12. The system of claim 8, wherein the system is further configured to:
update the user interface by a cloud connector connected to the cloud-enabled network device through a management link established between the cloud connector and the cloud-enabled network device.

13. The system of claim 8, wherein the system is further configured to:
check a uniform resource identifier (URI) in the request against a list of URI of static resources maintained by the cloud relay server.

* * * * *